(Model.)

H. C. MINER.
STANCHION.

No. 388,572. Patented Aug. 28, 1888.

Witnesses:
F. W. Ballard.
L. L. Crosby.

Inventor:
Henry C. Miner.
By G. W. Croford, Atty.

UNITED STATES PATENT OFFICE.

HENRY C. MINER, OF STAFFORD, NEW YORK.

STANCHION.

SPECIFICATION forming part of Letters Patent No. 388,572, dated August 28, 1888.

Application filed May 15, 1888. Serial No. 274,018. (Model.)

*To all whom it may concern:*

Be it known that I, HENRY C. MINER, a citizen of the United States, residing at Stafford, in the county of Genesee and State of New York, have invented a new and useful Cattle-Stanchion, of which the following is a specification.

My invention relates to improvements in stanchions for securing cattle in a proper position for feeding when housed in the stable; and the objects of my improvements are, first, to provide a secure fastening, largely automatic in its operation, by the use of a spring locking device; second, to afford facilities for locking the cattle in position and releasing the same with a mittened hand, and, third, to assure the safe detention of the animal by the use of simple devices quickly manipulated, durable, and forming a sure and safe lock. I attain these objects by the devices illustrated in the accompanying drawings, in which—

Figure 1:
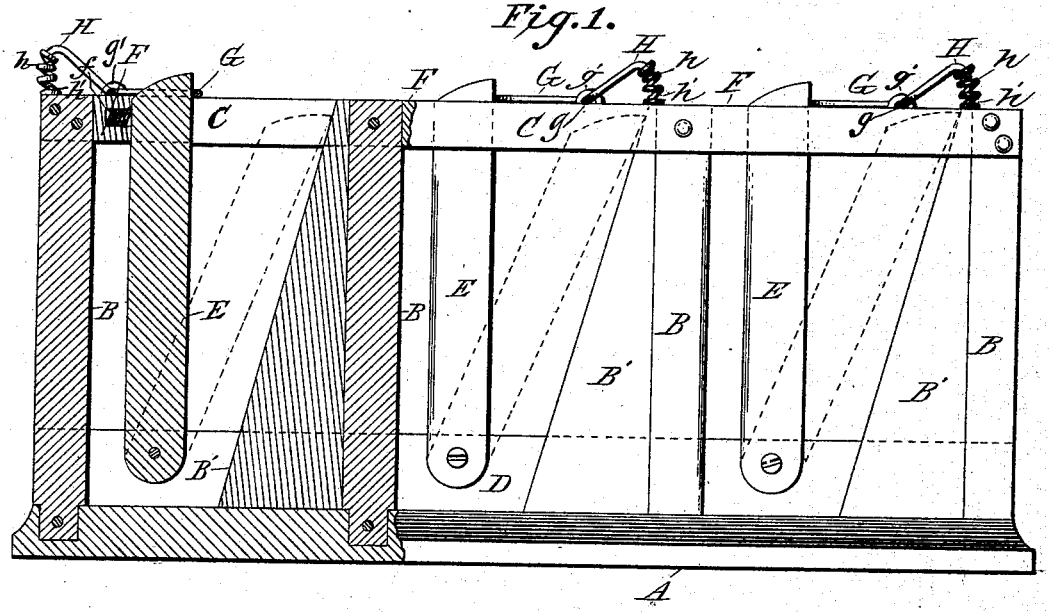
Figure 2:
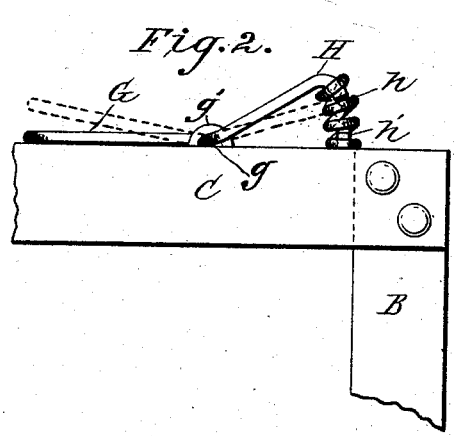

Figure 1 is a side elevation with parts broken away and having dotted lines, showing the working of the parts. Fig. 2 is a like view showing the securing-bail and its mode of operation.

Similar letters refer to similar parts in the several views.

The base A has mortised therein upright posts B, to the top of which, upon either side thereof, are secured the upper beams, C. Resting upon the base A is a lower beam, D, to which are pivoted the stanchions E, the upper ends of which are made to pass between the beams C. B' are other posts parallel with and secured to posts B. The posts B' are made tapering, so that as the pivoted stanchion is swung back an enlarged space may be secured for the purpose of admitting the head of the animal and for the release of the same, as will be hereinafter explained.

F F are blocks, each having one end abutting against the post B, the other end serving as a stop to the movement of the pivoted stanchion when the same is in a locked position.

*f* is a spiral spring inserted in a hole in block F, against which the stanchion rests, the spring being compressed as the stanchion is being placed in proper position for securing the animal.

G is a stanchion-securing bail, having offsets *g*, which are straddled by the legs of the staples *g'* as the said staples are driven into the top edge of the beam C, whereby a hinge is formed for the swinging of the bail, as will presently appear.

H is an upwardly-inclined stem at right angles with one of the bail-offsets, which is used as a hand-lever for raising the bail when unlocking the stanchion. This hand-lever has a downward bend which enters the coil in the top end of the spring *h*.

*h'* is a pin driven into the beam underneath and in line with the bent portion of the handle, which engages the lower end of the spring *h*, and also acts as a stop against which the bent end of the handle strikes as the bail is lifted.

In practical operation, when it is desired to secure the animal the stanchion is thrown back, as shown in dotted lines. The head of the animal is thrust through between the now inclined stanchion and the post B, when the stanchion is, from its pivotal end, swung toward the animal and against the stop-block, compressing the spring in the same, and in the meantime the bail, by its end cross-bar coming in contact with the beveled end of the stanchion, is raised, after which the spring underneath the hand-lever will force the bail down upon the top of the beams with the end of the said bail impinging against the back side of the now upright stanchion, thereby locking the same until the operator desires to release the animal. In releasing the animal the bail is thrown up by a downward pressure of the hand upon the lever end, thereby releasing the bail from its contact with the stanchion, while the spring in the stop-block will immediately recoil, causing the stanchion to swing back, so that the animal can withdraw its head without further assistance from the operator. This work of securing and releasing the animal can be done without removing the mitten from the hand.

Having now described my invention, what I claim to be new, and desire to secure by Letters Patent, is—

1. The combination, with the supporting-frame having the upper beams, C, and lower beam, D, of the swinging stanchion E, the locking-bail G, having the offsets *g*, inclined stem H, and downward spring-supporting lever, the spiral spring $h$, the spring-retaining pin $h'$, and the staples $g'$, substantially as described.

2. The combination, with the supporting-frame having the upper and lower beams and the swinging stanchion, of the stop-block F between the upper beams, and the spring $f$ within said block for opening said stanchion, substantially as described.

HENRY C. MINER.

Witnesses:
 G. W. FORD,
 E. J. MOCKFORD.